Dec. 10, 1940.  A. BIEREND  2,224,664
BLADE RING FASTENING
Filed July 24, 1939  2 Sheets-Sheet 1

INVENTOR
ALFRED BIEREND.
BY
ATTORNEY

Dec. 10, 1940.  A. BIEREND  2,224,664
BLADE RING FASTENING
Filed July 24, 1939  2 Sheets-Sheet 2

INVENTOR
ALFRED BIEREND.
BY
A. B. Travis
ATTORNEY

Patented Dec. 10, 1940

2,224,664

UNITED STATES PATENT OFFICE 2,224,664

BLADE RING FASTENING

Alfred Bierend, Berlin-Charlottenburg, Germany, assignor to Westinghouse Electric & Manufacturing Company, East Pittsburgh, Pa., a corporation of Pennsylvania Application July 24, 1939, Serial No. 286,233
In Germany February 10, 1939

3 Claims. (Cl. 253—77)

My invention relates to radial flow turbines of the type wherein the blades are carried by supporting rings with the latter connected to the rotor and it has for an object to provide an improved connection between such a supporting ring and the rotor.

Heretofore, with radial flow turbines, it has been common practice to have the blade supporting rings connected to the turbine rotor disc by means of elastic connector rings. In accordance with the present invention, these intermediate or connector rings are eliminated, the rotor disc being formed with grooves for the insertion of tongues formed on the supporting rings and means are provided for locking the tongues in place, the latter means including flexible element or elements which are deflected incident to insertion of the tongues into the grooves and which, when the tongues are fully inserted, render locking or holding means effective to hold the flanges in place. A further object of my invention is to provide an improved turbine rotor and blade supporting ring construction having this connecting arrangement.

These and other objects are effected by my invention as will be apparent from the following description and claims taken in connection with the accompanying drawings, forming a part of this application, in which:

Figure 1:
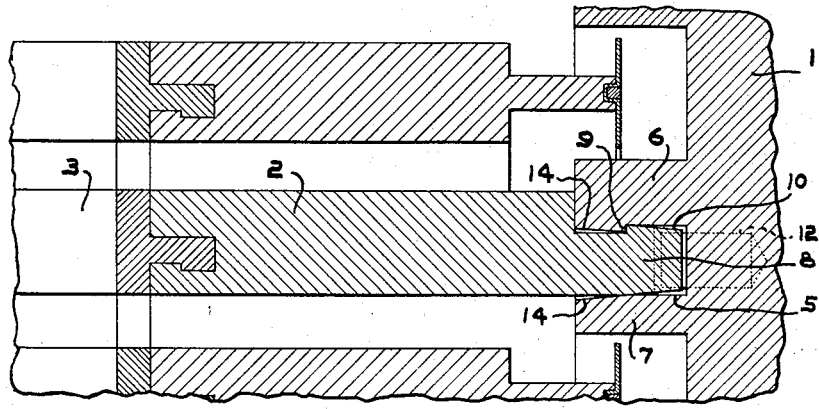
Fig. 1 is a sectional view of my improved connection between the blade supporting ring and the disc.

In Fig. 1, the turbine rotor 1 has connected thereto the cylindrical blade collar 2 with blades 3 attached to the outer end thereof.

The connection between the cylindrical blade supporting collar 2 and the rotor 1 includes a groove 5 formed on the latter and provided by outer and inner coaxial flanges 6 and 7. The outer flange 6 has such thickness in a radial direction as to be relatively strong and stiff and the flange 7 is relatively much thinner in a radial direction than the flange 6 and is therefore lighter and weaker than the latter. These flanges are to some extent elastic and permit of entrance of the collar root or tongue 8, which is slightly tapered.

Interlocking projections or shoulders 9 are carried by the flange 6 and by the root or tongue 8 at the outer side of the latter, these interlocking projections or shoulders preventing shifting of the blade supporting ring when the latter is fastened to the rotor.

In assembling, the tapered end 10 of the tongue or root 8 wedges the flanges 6 and 7 apart sufficiently to permit the projection on the tongue to pass inwardly by the projection on the flange, and, just as soon as the flange projection is free to do so, the spring force of the flanges due to deformation incident to insertion is effective to cause the flange shoulder to snap in behind the root shoulder, thereby locking the root in tꞏe groove.

While the root is tapered at 10 for the purpose indicated, I also prefer to provide the groove 5 with an entrance having converging walls 14 to reduce the flexure required.

A dowel 12 is carried by the rotor and prevents shifting of the blade ring circumferentially in the groove.

Figure 2:
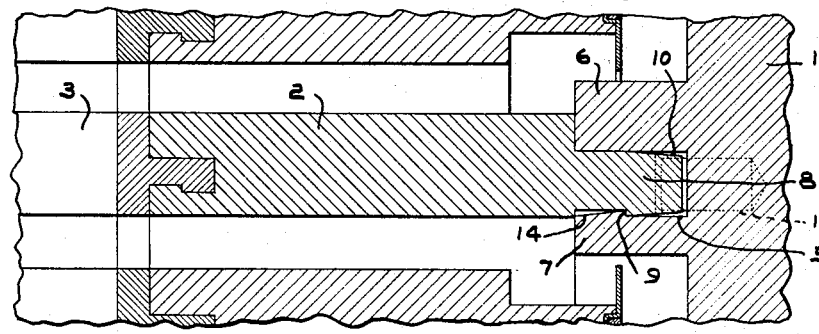
Figs. 2 and 3 show modified forms of the connection illustrated in Fig. 1.

Fig. 2 shows a construction similar to Fig. 1, except that, instead of having the interlocking projections 9 associated with the outer flange 6 and the outer face of the tongue or root 8, such projections are associated with the inner face of the root or tongue and with the inner flexible flange 7.

Figure 3:
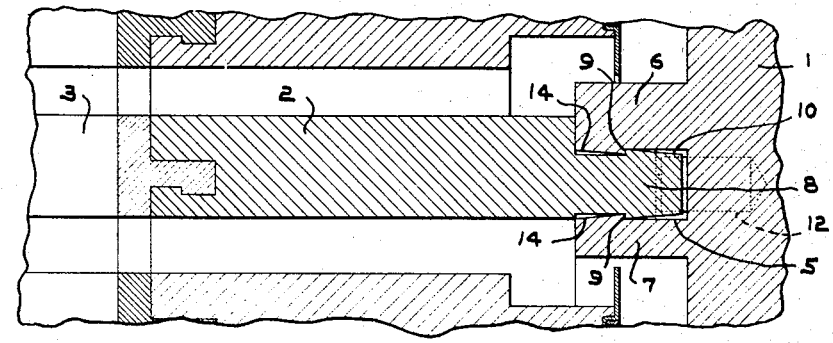

In Fig. 3, there is shown a construction wherein interlocking projections 9 are associated with both the flanges 6 and 7 and with both faces of the root or tongue.

Figure 4:
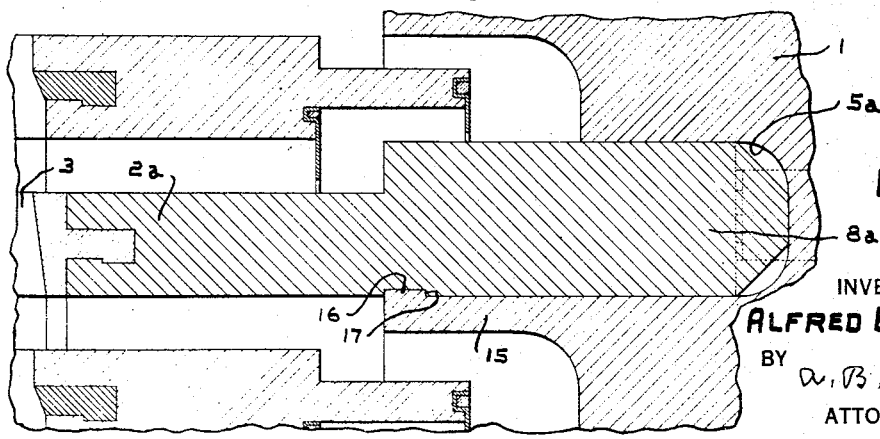
Fig. 4 shows a further embodiment of my invention.

In Fig. 4, the rotor 1 is provided with lateral grooves 5a for the reception of the root or tongue portions 8a of the blade supporting or holding rings 2a. The rotor is formed, at one side of the groove 5a, preferably the inner side thereof, with a flexible flange 15 which extends outwardly a suitable distance and has a projection 16 arranged to interlock behind a projection or shoulder 17 formed on the root or tongue when the latter is inserted.

In Figs. 5, 6, 7 and 8, there are shown further modifications wherein, instead of the root or tongue portion of the blade supporting collar completely filling the groove, one or more rings are shown in contact relation with such tongue or root portion in order to completely fill the groove, the ring or rings extending outwardly and having interlocking projections to hold the root or tongue in assembled relation with respect to the rotor.

Figure 5:
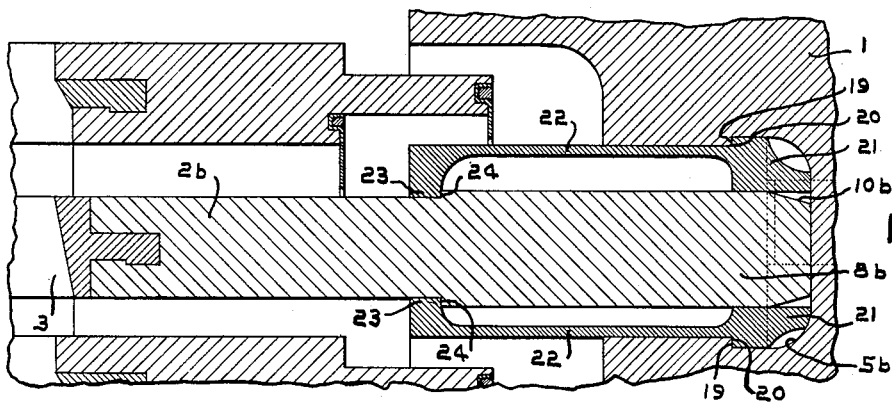
Figs. 5, 6, 7 and 8 show still other embodiments.

In Fig. 5, the rotor 1 has a groove 5b formed with inwardly-facing shoulders 19 which fit over shoulders 20 formed on inner end portions 21 of the flexible rings 22, which extend outwardly from the groove 5b and terminate in projections 23 to lock behind shoulders or projections 24 formed on the root portion. To assemble this construction, the pair of inner and outer rings is placed in the groove with the shoulders 20 fitting behind the shoulders 19, the root portion 8b is then inserted, it having a tapered entrance end 10b to facilitate entrance between opposed projections 23 of the rings, the wedge or tapered end assuring of outward flexure of the rings as the root portion is inserted and entrance of the inner end of the root or tongue portion between the inner portions 21 of the flexible rings to wedge the latter outwardly tightly against the side walls of the groove. When the root or tongue 8b reaches final position, the interlocking projections 23 snap in behind the shoulders or projections 24, whereby the blade holding ring 2b is locked to the rotor.

Figure 6:
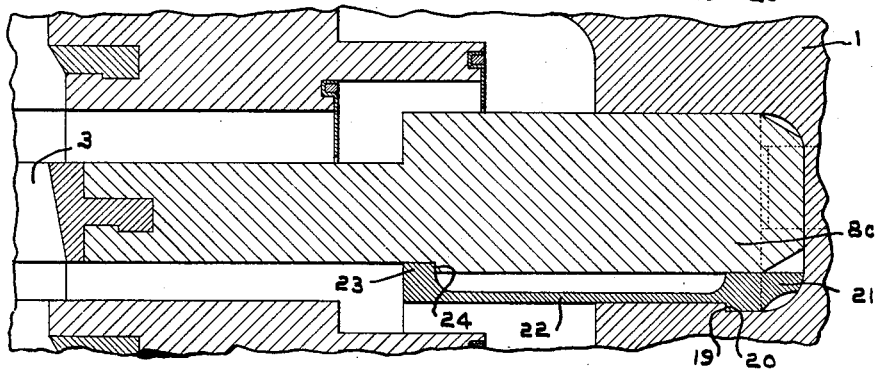

In Fig. 6, instead of having flexible rings 22 associated with both the inner and the outer faces of the root or tongue portion 8c, there is shown only one such ring associated with the inner face.

Figure 7:
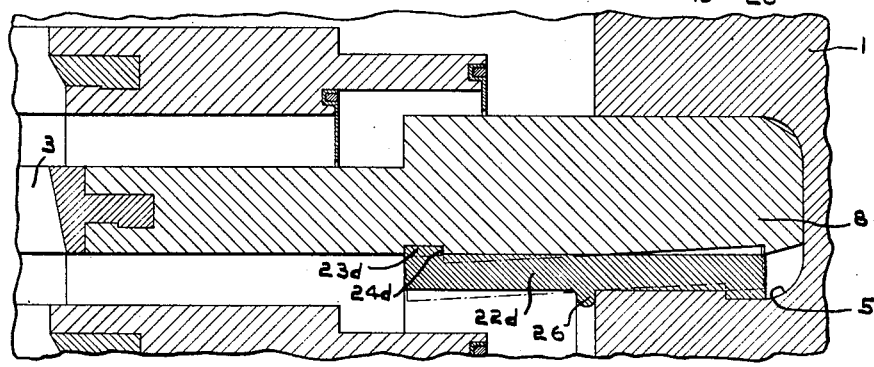

In Fig. 7, there is shown a single ring 22d arranged in abutting relation with respect to the inner face of the root or tongue portion 8d. The ring 22d has a projection 26 arranged to contact an outer corner of the groove 5d, whereby the ring may swivel during entrance of the root portion 8d, the initial position of the ring section as the root enters being indicated in dotted lines. As the root or tongue 8d enters the groove, the outer portion of the ring is flexed; and, when the projection 24d just passes the projection 23d, the latter snaps behind the former, thereby locking the root portion 8d in the groove.

Figure 8:
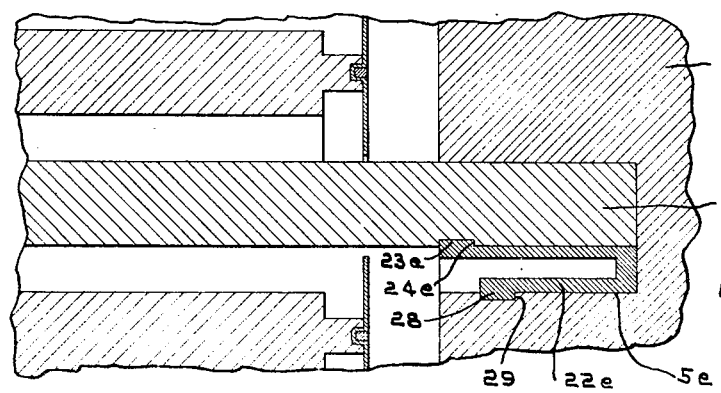

In Fig. 8, there is shown a further form of the invention wherein the lateral ring 22e is of U-shaped cross section to obtain the necessary elasticity of the fastening, the ring having projections 23e interlocking with projections 24e on the root portion 8e and projections 28 cooperating with projections 29 of one wall of the groove 5e. With this construction, the root or tongue 8e and the flexible ring 22e may be assembled in the groove 5e, the interlocking projections 23e and 24e snapping in place as the blade ring root or tongue 8e reaches final position.

From the structure so far described, it will be apparent that I have devised tongue and groove connections between blade supporting or holding rings and rotor discs, such connections incorporating flexible interlocking devices which permit of assembly and wherein the flexibility thereof rendered effective by insertion of a tongue into a groove becomes available to render the interlocking features effective to lock a blade supporting ring root in its groove. With this arrangement, if the blade holding collar or ring should become damaged, replacement of the entire rotor is not required for the reason that it is only necessary to renew the damaged blade collar.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a radial flow turbine, a rotor disc; a cylindrical blade collar; a row of blades supported from one end of the blade collar; said collar having its other end formed to provide a tongue; a pair of coaxial lateral flanges carried by the rotor and providing an annular groove therebetween for the tongue; interlocking projections for holding the tongue in the groove; one of said flanges being flexible and the terminus of the tongue being tapered to provide for insertion of the tongue with flexing of the flexible flange and establishment by the latter of the projections in interlocking relation when the tongue is fully inserted.

2. In a radial flow turbine, a rotor disc; a cylindrical blade collar; a row of blades supported from one end of the collar; said collar having its other end formed to provide a tongue; means on the rotor providing an annular groove for insertion of the tongue; and interlocking projections for holding the tongue in the groove; said means including a flexible wall element and the tongue having its outer end tapered to provide for insertion of the tongue with flexing of the flexible wall element and establishment by the latter of the projections in interlocking relation when the tongue is fully inserted.

3. In a radial flow turbine, a rotor disc; a cylindrical blade collar; a row of blades supported from one end of the collar; said collar having its other end formed to provide a tongue; coaxial lateral flanges formed on the rotor and providing a groove therebetween for the insertion of the tongue; interlocking projections for holding the tongue in the groove; the outer flange having sufficient thickness in a radial direction so as to be relatively stiff, the inner flange being flexible, and the terminus of the tongue being tapered to provide for insertion of the tongue into the groove with flexing of the inner flange and establishment of the latter by the projections in interlocking relation when the tongue is fully inserted.

ALFRED BIEREND.